(12) United States Patent
Houde-Walter et al.

(10) Patent No.: US 7,818,911 B2
(45) Date of Patent: Oct. 26, 2010

(54) TARGET MARKING SYSTEM HAVING A GAS LASER ASSEMBLY AND A THERMAL IMAGER

(75) Inventors: William R. Houde-Walter, Rush, NY (US); Susan Houde-Walter, Rush, NY (US); Jeffrey Mock, Rochester, NY (US); Jeffrey Wolinski, Perry, NY (US); Brian Olmsted, Spencerport, NY (US); Christopher Gagliano, Rochester, NY (US)

(73) Assignee: LaserMax, Inc., Rochester, NY (US)

( * ) Notice: Subject to any disclaimer, the term of this patent is extended or adjusted under 35 U.S.C. 154(b) by 367 days.

(21) Appl. No.: 11/925,351

(22) Filed: Oct. 26, 2007

(65) Prior Publication Data

US 2009/0110019 A1    Apr. 30, 2009

(51) Int. Cl.
*G02F 1/01* (2006.01)
(52) U.S. Cl. .................. 42/114; 89/41.17; 42/146; 250/330
(58) Field of Classification Search .............. 42/114, 42/113, 146; 89/41.17; 250/330, 332, 334
See application file for complete search history.

(56) References Cited

U.S. PATENT DOCUMENTS

2005/0099622 A1* 5/2005 Caracci et al. ............. 356/300
2007/0019702 A1   1/2007 Day et al.
2007/0030865 A1   2/2007 Day et al.

OTHER PUBLICATIONS

Stavatti Corporation: A Submission of the TIS-1 (Tactical Infantry System-1) Gasdynamic Laser Weapon System; Jul. 2, 1999.
Utkin, Goshe, Adamovich, Rich: Compact overtone band carbon monoxide laser; accepted Jan. 10, 2006.
Adamovich and Rich: Continuous Wave, Electrically Excited, Carbon Monoxide Laser Operating on First Overtone Infrared Bands, 2.5-4.0 microns; AIAA 2003-4301; Jun. 23-26, 2003.

* cited by examiner

*Primary Examiner*—J. Woodrow Eldred
(74) *Attorney, Agent, or Firm*—Dominic P. Ciminello, Esq.; Brian B. Shaw, Esq.; Harter Secrest & Emery LLP (57) ABSTRACT

A handheld target marker is provided, wherein the target marker includes a housing retaining a gas laser, a collimating or focusing lens, a driver and a power supply. The laser produces a thermal infrared beam which can be selectively directed to impinge upon a target. The impinging beam is viewable by a thermal imager. The handheld target marker operates at ambient temperatures and incorporates the driver and power supply necessary for operation of the laser, wherein the beam can be pulsed for enhancing imaging on the thermal imager.

20 Claims, 4 Drawing Sheets

TARGET MARKING SYSTEM HAVING A GAS LASER ASSEMBLY AND A THERMAL IMAGER

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A "SEQUENCE LISTING"

Not Applicable.

BACKGROUND OF THE INVENTION

1. Field of the Invention

The present invention relates to a target marking system, and more particularly, to a handheld or weapon mounted device incorporating a gas laser such as a carbon dioxide ($CO_2$) or carbon monoxide (CO) laser for generating and impinging a thermal infrared beam upon a target to create a corresponding image in a thermal imager.

2. Description of Related Art

Thermal imagers operate in the mid- and long-wave infrared bands (3-5 micron and 8-12 micron, respectively). Ideal "black bodies" radiate in a spectral region determined by their temperature. "Grey bodies" emit similarly, but the spectral radiance is mediated by material properties. All real objects are grey bodies, and radiate in a manner that can be related to temperature. For example, an object at a temperature of 98.6° F. is self-luminous in a broad infrared band, with a peak emission near 9 microns in wavelength. A thermal imager is sensitive at this wavelength and can be made to distinguish an object at that temperature to one that is either cooler or hotter. In contrast to image intensifier or $I^2$ devices, thermal imagers do not require external illumination, whether from the ambient or laser or other sources. Conversely, image intensifier or $I^2$ technology do not detect the thermal emissions.

Thermal imaging systems have been used in a variety of fields including medical and engineering as well as security, such as border and asset monitoring. While these applications allow monitoring and imaging of otherwise invisible radiation, the systems do not provide for a proactive approach to situational developments. No system exists for employing thermal imaging for actively marking targets.

The need exists for a target marking system having a handheld, portable target marker which can impinge a thermal infrared beam upon the target to create a corresponding infrared radiation in the sensitivity range of a thermal imager, thereby identifying the target when viewed with the thermal imager. The need also exists for a target marking system, wherein a thermally detectable beam cooperates with a thermal imager to provide for enhanced target marking as well as communication.

BRIEF SUMMARY OF THE INVENTION

The present system includes a target marking system employing a portable or weapon-mounted target marker which can selectively create a beam of thermal infrared radiation. The beam can be either directly viewed by a thermal imager or can be used to induce a local temperature differential on the target which is viewable by the thermal imager. The target marker further provides for operation in a robust configuration for use at ambient temperatures found in field environments.

In one configuration, the target marking system encompasses a target marker including a handheld housing having an interior and an exterior; a gas laser such as a carbon dioxide ($CO_2$) laser retained in the interior of the housing for emitting a beam at a thermal infrared wavelength along a beam path; a driver retained within the housing and operably connected to the $CO_2$ laser; a lens system including one of a collimating or a focusing lens connected relative to the housing and located in the beam path; and a power supply retained within the housing and operably connected to the laser. The driver manipulates the operating parameters of the laser in conjunction with the thermal imager to provide to enhanced imaging by the thermal imager as well as communication from the target marker to the thermal imager.

In a further configuration, the target marker includes a handheld housing having an interior and an exterior; a $CO_2$ laser retained in the interior of the housing for emitting a beam at a thermal infrared wavelength along a beam path; a driver retained within the housing and operably connected to the $CO_2$ laser; a lens system including one of a collimating or a focusing lens connected relative to the housing and located in the beam path; and a power supply retained within the housing and operably connected to the $CO_2$ laser.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention, and together with the description serve to explain the principles and operation of the invention.

DETAILED DESCRIPTION OF THE INVENTION

Figure 1:
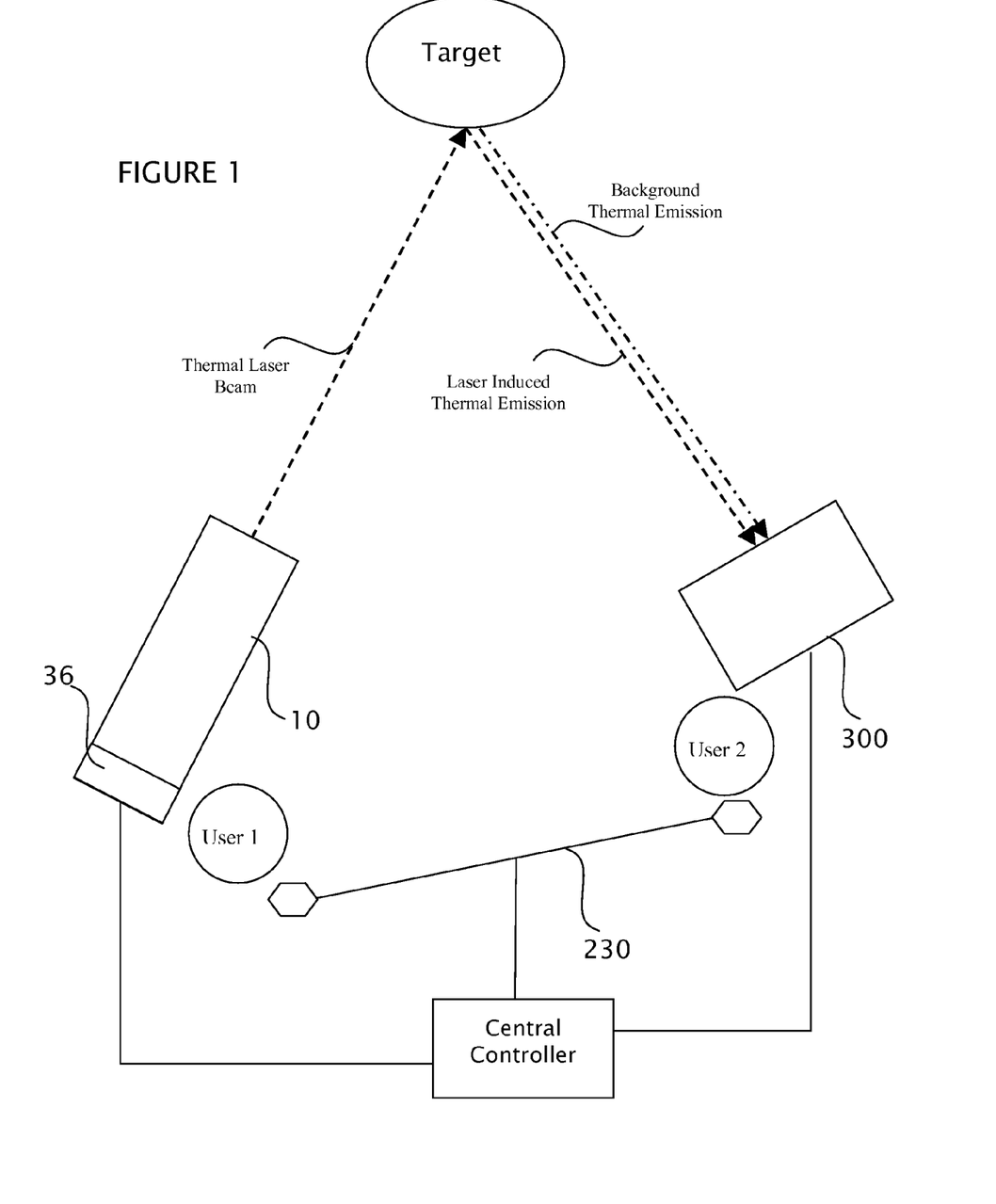
FIG. 1 is a schematic view of the target marking system.

Referring to FIG. 1, a target marking system includes a target marker 10 for use with a thermal imager 300. Although the target marker 10 is shown as a separate and independent construction from the thermal imager 300, it is contemplated the target marker can be cooperatively or integrally connected to the thermal imager. For purposes of description, the target marker 10 is set forth as a separate, remotely deployable device from the thermal imager 300.

The thermal imager 300 is known in the art and can be any of a variety of configurations. In the thermal imager 300, thermal infrared radiation, spanning the infrared range, preferably 7 to 14 microns, is captured and converted into a visible image. Objects with temperatures above 0° Kelvin emit light energy (black body radiation), a portion of which is in the thermal infrared spectrum. Thus, all objects above 0° K. are theoretically viewable by the thermal imager 300.

In one form of the thermal imager 300 (a micro-bolometer array), the infrared radiation (photons at the infrared wavelength) are impacted against an array of infrared detector elements, which creates a temperature pattern, often called a thermogram. The thermogram is translated into electrical impulses which are sent to a signal processing unit which translates the information into a display, wherein the image typically appears corresponding to the intensity and wavelength of the received infrared emission.

The underlying sensing and display technology of the thermal imager 300 is well-developed and employed in devices made by DRS, Raytheon, FLIR, ITT or BAE and others. "Thermal imaging" and "thermal detection" refers to imaging and detection in the electromagnetic spectral band of 8-12 microns. "Thermal infrared beam" refers to electromagnetic energy in the 8-12 micron wavelength range.

For purposes of disclosure, a brief description of the thermal imager 300 is provided. Generally, the thermal imager 300 includes four primary components retained within an imager housing, wherein the imager housing is configured to be carried by an individual.

The first primary component of the thermal imager 300 is a sensor (often referred to as a "camera") that reacts to infrared radiation, converting sensed thermal radiation (the "thermal picture") of an area into a visible thermal image in which, relative to the surrounding environment, hotter areas appear white while cooler areas appear black. One of two sensors is commonly used in portable thermal imagers: (1) a barium strontium titanate ("BST") detector developed by the Raytheon Company of Lexington, Mass. or (2) a microbolometer with a vanadium oxide (VOx) or an amorphous silicon sensing material, such as the LTC500 MicroIR™ Imaging Camera manufactured and distributed by BAE Systems of Nashua, N.H.

The second primary component of the thermal imager 300 is a lens which focuses the thermal image onto the sensor, and specifically onto a focal plane array (FPA) of independent pixels. The quality of the lens is an important factor in the quality of the resultant image. Better aberration correction typically involves additional lens elements and hence more weight and cost. For this reason, a common lens provides a field of view up to approximately 60°, and a common material for lens construction is germanium.

The third primary component the thermal imager 300 is the video display, the means by which the resultant thermal image is provided to the user. An active matrix liquid crystal display ("LCD") is commonly used in portable thermal imagers. Typically, the thermal imager 300 has a detectable temperature differential of approximately 0.1° C. However, as thermal imaging technology improves, the detectable temperature differential may decrease. As discussed herein, the detectable temperature differential can be accommodated by controlling operating parameters such as power of the laser, pulse rate and spot size (focal adjustment).

Finally, the fourth primary component the thermal imager 300 is a power supply. A NiMH or similar rechargeable battery can be used in portable thermal imagers, although alkaline or other common batteries can be also used.

The thermal imager 300 can have a variety of operating parameters that can be optimized for operation in conjunction with the target marker 10. For example, a level setting, central temperature, displayed $\Delta T$, dynamic range and gain can be selected to optimize the image of the target marker 10 on the target. In one configuration, the thermal imager 300 is selected to detect an illumination frequency within the field of view, wherein the pixels associated with the frequency can be enhanced, and in selected configurations assigned a false color to enhance the displayed image to the user. That is, the thermal imager 300 can phase lock on a particular frequency to provide an enhanced image.

The present target marker 10 can be employed to fulfill any of a variety of functions. Thus, the term "marker" includes a pointer, an aimer (or aiming device) as well as a designator (target designator). A pointer typically encompasses use of the target marker 10 to identify a particular location or entity within a group of entities. An aiming device is typically used in conjunction with a firearm or crew-served weapon, wherein the target marker 10 provides an intended point of impact of an associated projectile. When used as a designator, the target marker 10 is used as or with a target-tracking laser beam and for providing range data indicative of the range to the target. Each of these systems being known in the art, further description is not necessary.

Thus, "marking" encompasses aiming (aiming from one's own weapon), pointing (indicating for other's weapon system), locating (for conventional and coordinate-guided munitions) and/or designating (for laser-guided munitions).

The target marker 10 includes a housing 20, a vibrational mode or gas laser 30, such as a carbon dioxide ($CO_2$) or carbon monoxide (CO) laser, a driver 40, a lens system 60 which can include collimating or focusing optics and a power supply 70.

Figure 2:
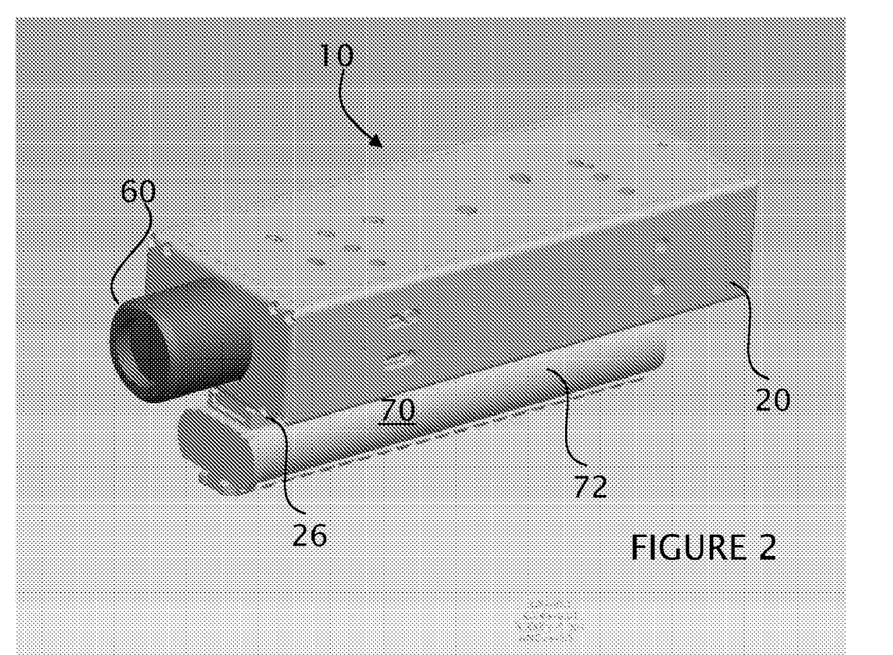
FIG. 2 is a front perspective view of the target marker.
Figure 3:
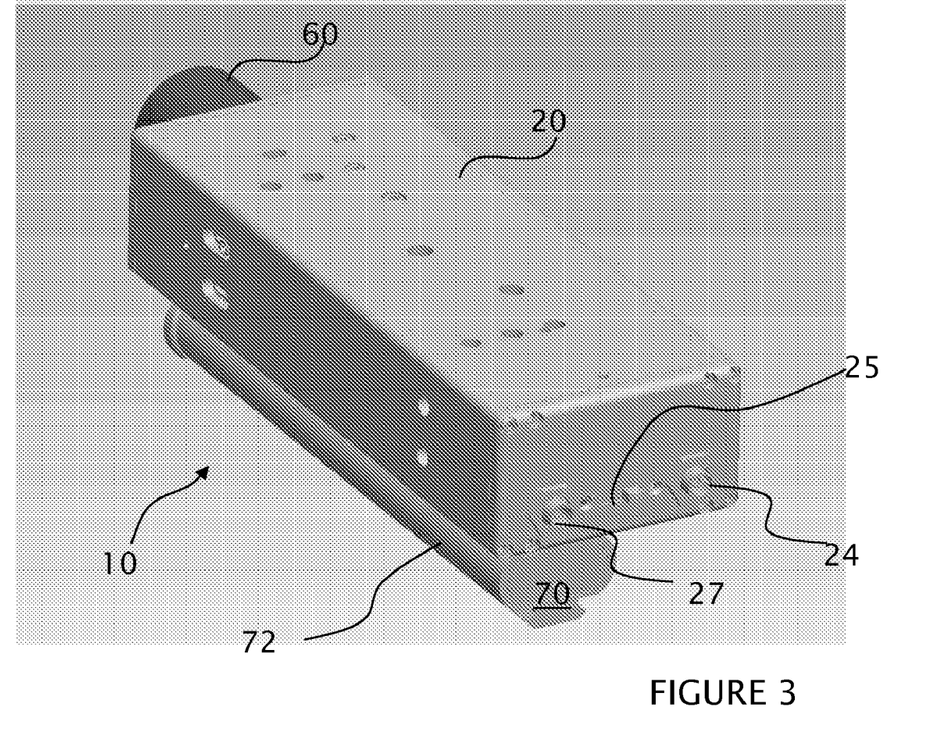
FIG. 3 is a rear perspective view of the target marker.
Figure 4:
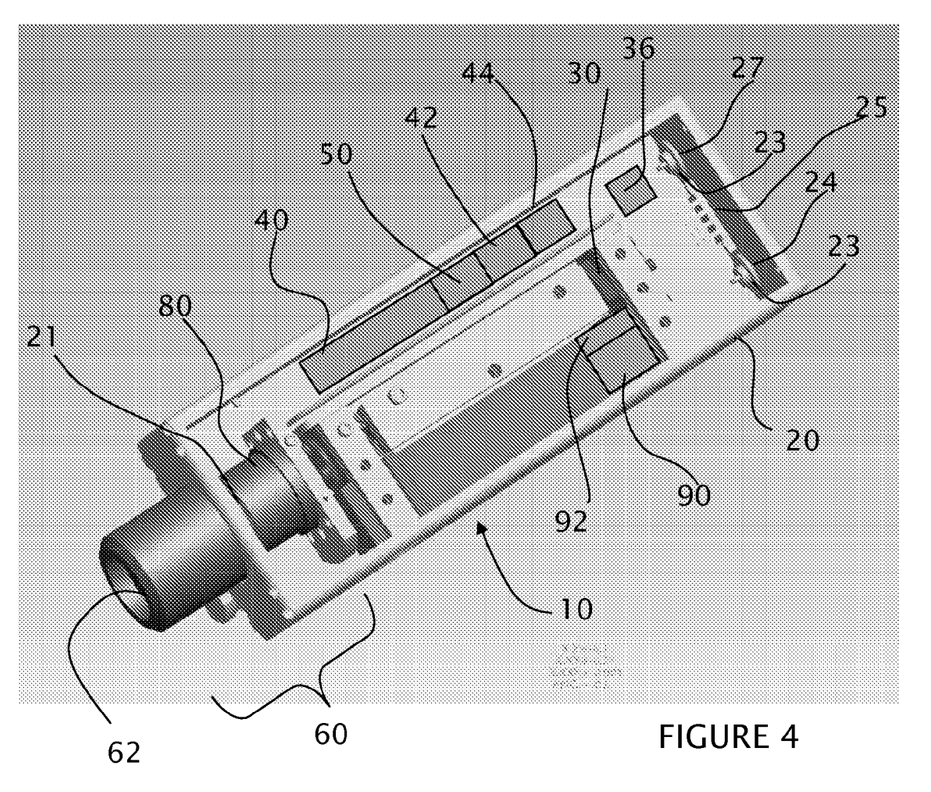
FIG. 4 is cut away perspective view of the target marker showing the internal components.

The housing 20 can be a handheld configuration or a firearm mounted configuration. The housing 20 is selected to encompass the $CO_2$ laser 30, the lens system 60, the driver 40 and, in one configuration, the power supply 70. In one configuration, the housing 20 encompasses (retains) all the components required for operation of the laser 30. That is, the housing 20 provides the target marker 10 as a self-contained hand-held portable device. Referring to FIGS. 2-4, the power supply 70 can be located outside the housing 20 in a separate power supply housing 72.

In one configuration, the housing 20 has a length between approximately 8 inches to 14 inches, a width between approximately 1.5 inches to 5.5 inches and a height between approximately 1 inches to 3 inches. In a further configuration, housing 20 has a length of approximately 11 inches, a width of approximately 3.5 inches and a height of approximately 2 inches.

It is contemplated, the housing 20 can include an aperture 21 for emission of a beam from the laser 30. In addition, the housing 20 can include apertures or ports 23 for control of the target marker 10 such as an on/off or momentary switch 24, as well as switches or controls for operating mode selections such as a mode switch 25 for selecting continuous, pulse or off. In addition, the housing can include a port 27 for operably connecting to the remote power supply.

The housing 20 can be formed of any of a variety of rigid material such as composites, laminates, plastics or metals. In one configuration, the housing 20 is formed of an extruded aluminum, thereby providing sufficient strength without requiring significant weight. However, it is understood the housing 20 can be machined such as by EDM (electrical discharge machining) or molding if composites, laminates, plastics or even metals are employed for the housing.

In one configuration of the target marker 10, the housing 20 is configured to mount to any of a variety of handheld and small arms such as pistols, rifles, shotguns, automatic, semi-automatic arms collectively referred to as firearms. The housing 20 can include mounts 26 to interface with any of a variety of clamping or mounting mechanisms such as a Weaver style, Picatinny rail or dove tail engagement. In the firearm mounted configuration, the housing 20 can include adjustment slides, grooves, rails or steps to facilitate adjustment of the housing 20, and hence target marker 10 relative to the firearm along intersecting horizontal directions. In a further construction, the target marker 10 can be tripod mounted. The target marker 10 can also be mounted to a vehicle, including land, sea or air vehicles. The target marker 10 can be robotic or remotely controlled so that orientation and operation of the target marker can be directed from a spaced or remote location.

The gas laser 30 can be a carbon dioxide laser ($CO_2$), which is retained within the housing 20 and configured or beam shaped, such as by collimating or focusing optics in the lens system 60, to produce a beam extending along a beam path. The beam path extends from the $CO_2$ laser 30, through the focusing lens system 60 and a portion of the housing 20 to pass to the exterior of the housing.

The $CO_2$ laser 30 has a wavelength of 10600 nanometers (10.6 microns). Some $CO_2$ lasers 30 have a tunable wavelength between approximately 10.3 microns and 10.8 microns. Thus, the $CO_2$ laser 30 operates in the long wavelength infrared spectrum of approximately 10 to 11 microns.

Although a single $CO_2$ laser 30 is shown in housing 20, it is contemplated a plurality of $CO_2$ lasers can be disposed within the housing or a single carbon dioxide laser can be employed with an appropriate driver and filter to provide a plurality of corresponding wavelengths.

The $CO_2$ laser can be any of a variety of commercially available devices including but not limited to Synrad Inc. of Mukilteo, Wash. Although a variety of $CO_2$ lasers can be employed, it is advantageous for the laser to be relatively light weight, as the target marker 10 may be carried by an individual. The power of a typical $CO_2$ laser is on the order or 10 W or less.

Although the laser 30 is set forth as a $CO_2$ laser, it is understood other molecular vibrational mode or gas lasers can be employed. For example, a further vibrational mode gas laser includes a carbon monoxide laser. The carbon monoxide laser provides a beam having a wavelength of approximately 9.3 microns.

In one configuration, the laser 30 is hermetically sealed within the housing 20, thereby providing a controlled humidity and atmosphere for operation of the laser. Such hermetic sealing can include a subhousing or potting of the laser 30. The sealing can include a sealing of the housing 20, a sealing of the laser 30 as the laser is retained within the housing, or both.

In a further configuration, the $CO_2$ laser 30 is employed without an associated reservoir of lasing medium. That is, the target marker 10 is free of the lasing medium reservoir, thereby reducing the size and weight of the target marker 10.

The driver 40 can be constructed to provide either pulsed or continuous wave (CW) operation of the laser 30. Operation in either the pulsed or continuous wave can be momentary or uninterrupted. That is, operation of the target marker 10 can be entirely either pulsed or continuous, or a combination of pulsed and continuous. The rise/fall time of the pulse, voltage and current for $CO_2$ laser 30 are selected to minimize power consumption and heat generation. The pulse rate can be any of a variety of rates. Typical pulse rates include 1 to 20 Hz, wherein the pulse rate is sufficient to allow the illuminated portion of the target to heat and cool, corresponding to the cycle of the laser 30. The driver 40 is configured to provide a pulse rate which thermally cycles or modulates the target, thereby enhancing detection of the marked target.

In one configuration, the driver 40 can be configured to provide, in cooperation with an IFF (identification, friend or foe) transceiver 42, an identification, friend or foe (IFF) identification system for command and control. The IFF transceiver 42 can enables military, and national (civilian located ATC) interrogation systems to distinguish friendly aircraft, vehicles, or forces, and to determine their bearing and range from the interrogator. It is further contemplated, an IFF transponder 44 can be operably coupled with the driver 40 or can be a separate component that is in communication with the driver 40 such that the driver embeds the IFF signal in to the projected beam.

The IFF transponder 44 responds in a military aircraft, vehicle, or unit by returning a coded reply signal only when the incoming interrogation is identified as part of the friendly forces network; if no IFF response is generated a civil (Selective Identification Feature—SIF) interrogation may then be generated and the aircraft, by returning various mode replies can then be identified or sorted.

Further, it is contemplated the driver 40 can be configured to pulse the laser 30 with a pulse length less than a millisecond. However, it is understood depending upon the intended use and range of the target marker 10, the repetition rate and/or peak power can be at least factory set as needed. In the configuration in which the laser 30 is pulsed, the repetition rate and peak are selected to provide a sufficient beam that can create a temperature differential that can be seen in the thermal imager 300 yet maintain operation of the target marker 10 at ambient temperatures. That is, sufficient heat dissipates prior to the next pulse.

The pulse cycle of the laser can be between approximately 0.5 Hz to approximately 20 Hz, with an advantageous frequency between approximately 10 Hz and 12 Hz. These frequencies are selected as the resulting pulsing spot when viewed by the operator on the thermal imager 300 is particularly enhanced. That is, pulsation at a frequency between approximately 10 Hz and 12 Hz employs the sensitivity of the eye to those frequencies and thus enhances visibility to the user.

The driver 40 can be selected to modulate the pulse cycle of the target marker 10. That is, a signal can be embedded into the modulation frequency of the beam, and the detection circuitry of the thermal imager 300 can be synchronized to detect at the same phase and modulation frequency for each pixel of the imaging array. Thus, the thermal imager 300 can be sensitized to detect and highlight the location of the thermal marker beam in the field of view of the imager. The location of the beam in the field of view can be enhanced, either by color coding, contrast enhancement, or by displaying special borders or other features to attract the observer's eye. Such highlighting imparts an even further useful range of the target marker 10 and thermal imager 300.

The driver 40 can also be selected to include or communicate with an LC (an inductor-capacitor) circuit to automatically or actively optimize the RF coupling of the driver with the laser 30.

The driver 40 is located within the housing 20 and operably connected to the laser 30. Generally, the driver 40 includes a pulse generator, an RF generator, an amplifier and a laser matching circuit. Although the driver 40 is described as retained within the housing 20, it is understood the driver can be incorporated in a separate module, and connected to the housing by a cable, such as a coaxial cable.

Figure 5:
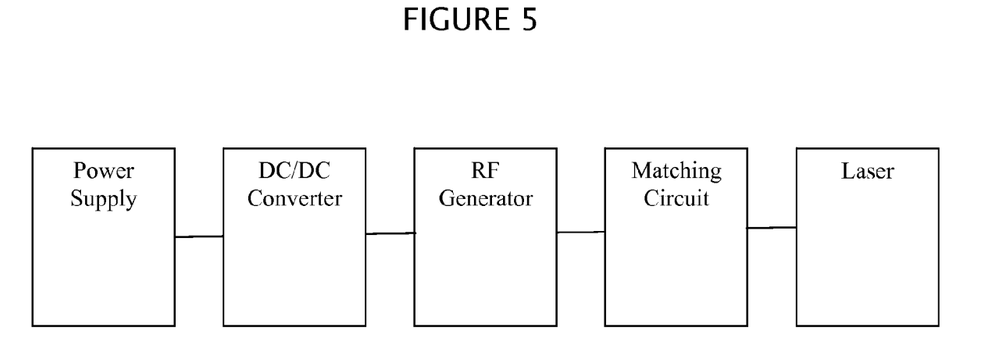
FIG. 5 is a schematic of the driver circuit of the target marker.

Referring to FIG. 5, a schematic of the driver 40 operably connected to the $CO_2$ laser 30 is shown. In view of current $CO_2$ constructions, the driver 40 allows for operation as a pulsed laser, such as by passive switching. Although specific values depend upon the particular laser 30 and intended operating parameters, it is contemplated the peak power draw may be between approximately 1 to 10 amps, with an average current draw of approximately 0.01 to 0.1 amps, and in one configuration the average current draw would be approximately 0.5 to 5 amps. The required voltage may be from approximately 15 VDC to 30 VDC volts and approximately 15 to 300 W may be consumed. This represents a substantial power consumption as well as heat generation.

A look up table LUT accommodates the temperature induced impedance changes of the $CO_2$ laser 30. The look up table LUT can be employed to modify control of an amplifier in the driver 40 in response to the temperature of the $CO_2$ laser 30. Depending upon the consistency of the $CO_2$ laser 30 (or uniformity of the $CO_2$ laser) in response to temperature changes, the look up table LUT may be determined for each individual $CO_2$, and hence target marker 10, or for a given batch or set of $CO_2$ lasers. As described, one configuration contemplates that the look up table LUT can be burned to a flash memory. Thus, the appropriate compliance voltage to accommodate for temperature fluctuations of the CO2 30 are carried by the target marker 10 in the look up table LUT.

The driver 40 can be a dedicated processor or a programmed processor. Depending upon the intended operating parameters of the target marking system, the driver 40 can be incorporated into the housing 20, and provide operable interface to a system controller 50 or incorporated into the system controller.

The system controller 50 is a dedicated processor integrating interaction of the target marker 10 with the thermal imager 300, as well as any secondary communications systems 230.

The lens system 60, which can include beam shaping optics including collimating or focusing optics, is disposed in the beam path such that in one configuration, the lens system is retained within the housing 20. However, it is contemplated the lens system 60 can include focusing optics forming an interface between the interior and the exterior of the housing 20. The lens system 60 can be configured to focus the beam at a particular point or a specified distance from the target marker 10. In a further configuration, the lens system 60 can include the focusing optics and a dedicated collimator, thereby collimating the beam along the beam path.

In one configuration, the lens system 60 can include a diffractive optic 80 located within the beam path to provide collimation of the beam. That is, the diffractive optic 80 intersects the beam path such that the beam passes through or reflects off of the diffractive optic. The diffractive optic 80 can be configured as a hologram for imparting predetermined characteristics to the beam. For example, the diffractive optic 80 can include a reticle image.

In an alternative configuration, the diffractive optic 80 can be employed in the place of refractive optics, thereby allowing a reduction in the weight of the system. It is also contemplated the diffractive optic 80 can be fixed or movable relative to the beam path, thereby providing selective manipulation of the beam.

The lens system 60 can include optics to provide a sub-diffraction limited spot size for the beam at the intended targeting range. For example, an annulus aperture can be disposed at a downstream end of focusing optics in the lens system 60 to reduce the spot size at far field. Alternatively, the laser 30 can include an annular cavity, wherein mirror feedback only occurs within the annulus. It is also contemplated the lens system 60 can provide a non-diffracting beam through an axicon lens.

The lens system 60 is formed of a material substantially transparent to the wavelength of the beam from the laser 30. In addition, or alternatively, a filter 62 can be incorporated into the lens system 60 to selectively pass and reflect certain wavelengths. For example, a Germanium (Ge) or Gallium Arsenide (GaAs) lens or filter can be used to block near infrared (near IR), short wavelength infrared (SWIR) and visible wavelengths, while passing 8-13 micron wavelengths. The filter 62 is selected to block or reflect radiation wavelengths corresponding to the plasma state in the lasing medium, thereby reducing the signature of the target marker 10.

In one configuration, the power supply 70 includes at least one battery. Depending upon the anticipated power requirements, available space and weight restrictions, the batteries can be commercially available 123 batteries, N-type batteries or AA or AAA batteries. Additionally, a lithium/manganese dioxide battery such as military battery BA-5390/U, manufactured by Ultralife Batteries Inc. of Newark, N.Y. can be used with the target marker 10. It is understood that any type of power supply 70, preferably portable and sufficiently small in size for use in a hand held device can be utilized. The battery type power supply can be disposable or rechargeable.

In one configuration, the power supply 70 is located within the housing 20. In one configuration, the housing includes a battery compartment 28 sized to operably retain the batteries. In the firearm configuration of the target marker 10, the battery compartment is configured to accommodate any recoil associated with any discharge of the firearm. The battery compartment can be formed of a weather resistant, resilient material such as plastic and shaped to include receptacles for receiving the battery(ies) required for power. Further, the battery compartment be selectively closeable or sealable to prevent environmental migration into the compartment.

In an alternative configuration, the power supply 70 can be retained in a separate power supply housing 72 configured to engage any of a variety of clamping or mounting mechanisms such as a Weaver style, Picatinny rail or dove tail engagement. Thus, the power supply housing 72 (and power supply 70) can be carried on the exterior of the housing 20, or by the corresponding mount on the weapon. In this configuration, a power line interconnects the power supply to the driver (and controller) and the laser 30. As the power supply 70 is in the separate power supply housing 72, the user can readily remove a first power supply housing and either install a second power supply housing, or resupply the first power supply housing without requiring any movement or disassembly of the remainder of the target marker 10.

The power supply 70 is operably connected to the driver 40, as well as the system controller 50 and can be controlled by or utilized under driver or controller commands. Thus, the amount of power from the power supply 70 can be controlled or varied to alter the output of the laser 30.

In a further configuration, a temperature controller 90 can be disposed in thermal contact with the laser 30, such as a $CO_2$ laser, and the exterior of the housing 20. The temperature controller 90 is employed to maintain the laser 30 at a desirable operating temperature. As certain configurations of the temperature controller 90 require energy input, it is advantageous that the housing 20, the laser 30 and the driver 40 be configured to minimize thermal demands on the temperature controller 90. The temperature controller 90 can be a passive device or an active device. A passive temperature controller includes heat sinks, radiators or fins to dissipate thermal energy from the target marker 10. Active temperature controllers encompass Peltier modules, Stirling devices Peltier devices, Peltier diodes, Peltier heat pumps, solid state refrigerator, or thermoelectric cooler as well as fans.

Alternatively, a thermocouple 92 can be thermally coupled to the laser 30 to monitor the temperature, and the electronic look-up table LUT, such as one encoded in flash memory, can be used to control the driver 40 to achieve the desired optical output.

In a further configuration, the target marker 10 can be used with or incorporate an infrared laser (such as at 830 nm) for use with image intensifier devices and/or a visible laser (400 nm to 750 nm) such as HL6321 MG manufactured by Hitachi. The visible laser allows for a corresponding designator, pointing or aiming functions which are visible without requiring use of the thermal imager 300.

It is understood the target marker 10 can include a receiver and a transmitter (or a transceiver 36) for receiving and transmitting information from a remote source. Such information can include targeting data, as well as strategic data, thereby allowing silent coordinated operations. As the images of the thermal imager 300 are dynamic, the communication with remote sources allows coordination between a remote locations. The transceiver 36 is operably connected to the power supply. It is contemplated, the target imager 300, or a remote central controller can include a communicating transceiver with the target marker 10.

It is also contemplated, the target marker 10 can be cooperatively employed with the thermal imager 300 and a secondary communication system 230. The secondary communication system 230 provides communication between a user of the target marker 10 and a user of the thermal imager 300 or a separate member in the secondary communication system. Thus, in addition to the embedding of communications within the pulsed beam from the target marker 10, the secondary communication system 230 can be employed with the target marker and the thermal imager 300.

The secondary communication system 230 can be a wired system either dedicated or open, wherein the signals can be selectively encrypted. In a further configuration, the secondary communication system 230 can include a wireless system operating at any of a variety of frequencies as well known in the art. Again, the signals over the secondary communication system 230 can be selectively encrypted, as known in the art. An exemplary secondary communication system 230 includes, but is not limited to, third-generation (3G) wireless systems and mobile communication services, which can incorporate video teleconferencing and web browsing. Such 3G systems offer full interoperability (global roaming) as a result of the international IMT-2000 standardization. Pursuant to radio interface specifications for IMT-2000, five required interfaces enabling interoperability include IMT-DS (Direct Spread), IMT-MC (Multi-Carrier), IMT-TC (Time Code), IMT-SC (Single Carrier), and IMT-FT (Frequency Time). UTRA (W-CDMA) and cdma2000 make up three of the five IMT-2000 radio interfaces. Both systems utilize code-division multiple access (CDMA) techniques. Alternatively, a Mil-spec compliant secondary communication system 230 can be employed.

Operation

The target marker 10 is energized by the power supply 70 and a thermal infrared beam is projected from the laser 30 along the beam path. The beam passes through the lens system 60 and exits the housing 20. The housing 20 is oriented to direct the beam to impinge or intersect the object of interest, such as a target.

As the beam intersects the target, a local temperature differential is created, and a thermal signature or mark is created as the local area radiates. A portion of the radiated temperature gradient is captured by the thermal imager 300 and a corresponding visual representation is created. Additionally or alternatively, the reflected beam is imaged by the thermal imager 300.

It is further contemplated that the pulse rate of the target marker 10 can be varied to incorporate a communication signal, which is displayed at the thermal imager 300. That is, variations in the pulse rate can be used to provide silent and otherwise undetectable communications from the target marker to the thermal imager 300.

The target marker 10 is configured to provide an operable range on the order of up to a few hundreds of meters. However, as the technology of the thermal imager 300 improves, it is contemplated the target marker 10 can be modified by increasing the capacity of the laser 30 and power supply 70 to provide an operable range on the order of kilometers.

In those configurations employing multiple wavelengths for providing a fused system, the additional wavelengths are captured by corresponding imagers, wherein the respective images can be superimposed, blended or merged to provide a single depiction of the area of interest. Such single depiction can be on the thermal imager 300 or a separate display.

Further, as the thermal imager 300 can have a plurality of targets with an a field of view, the target marker 10 at a remote location can be activated and directed to intersect the beam with a selected one of the plurality of targets. Communication over the secondary communication system 230 can be employed to supplement the marking of the target by the remote target marker 10 as viewed on the thermal imager 300.

An additional application of the target marker 10 includes use as a tracer for weapons fire. In this application, the target marker 10 is used to mark a stream of weapons fire, wherein the resulting marking is displayed at the thermal imager 300 and appropriate modification of firing can be applied.

Although the present invention has been described in terms of particular embodiments, it is not limited to these embodiments. Alternative embodiments, configurations or modifications which will be encompassed by the invention can be made by those skilled in the embodiments, configurations, modifications or equivalents may be included in the spirit and scope of the invention, as defined by the appended claims.

The invention claimed is:

1. A target marking system comprising:
   (a) a thermal imager selected to detect and image thermal radiation;
   (b) a handheld target marker having a housing defining an interior and an exterior;
   (c) a molecular vibrational mode laser retained in the interior of the housing for emitting a beam at beam wavelength along a beam path, the beam wavelength selected to induce a localized temperature differential in a target detectable by the thermal imager;
   (d) a driver retained within the housing and operably connected to the laser causing the laser to emit the beam along the beam path;
   (e) a lens system connected to the housing and located in the beam path, the lens system including optics to one of focus and collimate the beam;
   (f) a filter in the beam path to substantially preclude passage of radiation outside the beam wavelength; and
   (g) a power supply operably connected to at least one of the driver and the laser.

2. The target marking system of claim 1, wherein the molecular vibrational mode laser is one of a carbon dioxide laser and a carbon monoxide laser.

3. The target marking system of claim 1, wherein the beam wavelength includes 10.6 microns.

4. The target marking system of claim 1, wherein the handheld target marker is one of a designator, a pointer and an aiming device.

5. The target marking system of claim 1, further comprising a temperature controller thermally coupled to the laser.

6. The target marking system of claim 5, wherein the temperature controller is one of a Peltier and a Stirling module.

7. The target marking system of claim 1, further comprising a diffractive optic in the beam path.

8. The target marking system of claim 6, wherein the diffractive optic collimates the beam.

9. The target marking system of claim 6, wherein the diffractive optic is one of movable and fixed relative to the beam path.

10. The target marking system of claim 1, wherein the laser is a tunable carbon dioxide laser.

11. The target marking system of claim 1, wherein the lens system includes sub diffraction limited optics.

12. The target marking system of claim 1, further comprising an LC circuit to one of automatically and actively optimize an RF coupling with the laser.

13. The target marking system of claim 1, further comprising one of a robotic or a remote control controlling the target marker enabling operating instructions to the target marker from a spaced location.

14. The target marking system of claim 1, further comprising one of an IFF transceiver and transponder operably connected to the target marker.

15. A weapons-mounted target marker viewable by a thermal imaging system, the target marker comprising:
 (a) a weapon selectively discharging a projectile, the weapon including an external mount;
 (b) a housing having an interior and an exterior, the housing releasably coupled to the external mount of the weapon;
 (c) a gas laser retained in the interior of the housing for emitting a beam at a thermal infrared wavelength along a beam path;
 (d) a driver retained within the housing and operably connected to the gas laser, the driver providing a pulsed beam along the beam path;
 (e) a lens system located in the beam path, the lens system one of focusing and collimating the beam; and
 (f) a power supply connected to one of the weapon and the housing for supplying power to the gas laser.

16. The weapons-mounted target marker of claim 15, further comprising a temperature controller thermally coupled to the gas laser.

17. The weapons-mounted target marker of claim 15, further comprising a diffractive optic in the beam path.

18. The weapons-mounted target marker of claim 15, wherein the gas laser is one of a carbon dioxide laser and a carbon monoxide laser.

19. The weapons-mounted target marker of claim 15, wherein the gas laser is tunable.

20. A target marker viewable by a thermal imaging system, the target marker comprising:
 (a) a mountable housing having an interior and an exterior, the housing selected to engage one of a weapon, a tripod and a vehicle;
 (c) a gas laser retained in the interior of the housing for emitting a beam at a thermal infrared wavelength along a beam path;
 (d) a driver retained within the housing and operably connected to the gas laser, the driver providing a pulsed beam along the beam path;
 (e) a lens system located in the beam path, the lens system one of focusing and collimating the beam; and
 (f) a power supply connected to one of the weapon and the housing for supplying power to the gas laser.

* * * * *